United States Patent [19]
Wheatley et al.

[11] Patent Number: 5,365,994
[45] Date of Patent: Nov. 22, 1994

[54] ADJUSTABLE FASTENER FOR TONNEAU COVER

[75] Inventors: Donald G. Wheatley; Douglas A. Steward, both of Ann Arbor, Mich.

[73] Assignee: Donald G. Wheatley, Ann Arbor, Mich.

[21] Appl. No.: 20,759

[22] Filed: Feb. 22, 1993

Related U.S. Application Data

[63] Continuation-in-part of Ser. No. 888,020, May 26, 1992, which is a continuation-in-part of Ser. No. 612,482, Nov. 14, 1990, Pat. No. 5,121,960.

[51] Int. Cl.⁵ .............................................. A47H 23/00
[52] U.S. Cl. ..................... 160/354; 160/383; 296/100
[58] Field of Search ............... 160/383, 327, 368.1, 160/354, 402, 403, 345, 330, 84.1 E; 296/100, 104, 36, 39.2, 214, 118; 24/129 R, 68 CD; 410/110, 105

[56] References Cited

U.S. PATENT DOCUMENTS

| | | | |
|---|---|---|---|
| 3,682,226 | 8/1972 | Ford | 160/330 |
| 3,905,414 | 9/1975 | Guebert et al. | 160/330 |
| 4,374,536 | 2/1983 | Becker | 160/84.1 E |
| 4,730,866 | 3/1988 | Nett | 296/100 |
| 4,848,824 | 7/1989 | Smith et al. | 296/100 |
| 5,058,652 | 10/1991 | Wheatley et al. | 296/100 X |
| 5,121,960 | 6/1992 | Wheatley | 295/100 |
| 5,152,574 | 10/1992 | Tucker | 296/100 |
| 5,207,262 | 5/1993 | Rushford | 160/383 X |

*Primary Examiner*—David M. Purol
*Attorney, Agent, or Firm*—Charles W. Chandler

[57] ABSTRACT

A snap fastener assembly useful for attaching a tonneau cover to a base structure such as a pick-up truck cargo box. The assembly includes a pair of mating fasteners, one of which is attached to the edge of the tonneau cover. The other fastener is slidably mounted along a rail on the sidewall of the cargo box. The rail-mounted fastener can be mounted in any of a plurality of positions in the direction the user pulls the cover to tighten it so that the user can adjust the tautness of the cover depending upon the position of the rail-mounted fastener.

14 Claims, 3 Drawing Sheets

ADJUSTABLE FASTENER FOR TONNEAU COVER

CROSS REFERENCE TO RELATED PATENT APPLICATION

This application is a continuation-in-part of co-pending patent application, Ser. No. 888,020 which was filed May 26, 1992 for "Cargo Box Cover Having an Improved Edge Fastener Mechanism" which in turn was a continuation-in-part of Ser. No. 612,482 filed Nov. 14, 1990, which has since been issued as U.S. Pat. No. 5,121,960 on Jun. 16, 1992 for "Rail Attachment System for Tonneau Cover".

BACKGROUND OF THE INVENTION

This invention is related to means for fastening a fabric member, such as a tonneau cover on a pick-up truck, and more particularly to a fastener assembly for adjusting the tautness of the fabric member.

Snap fasteners are commonly used to fasten a fabric member to a frame. For example, they may be used to connect a tonneau cover to the cargo box of a pick-up truck; see for example, U.S. Pat. No. 4,848,824 which was issued Jul. 18, 1989 to Gerald N. Smith, et al.

A problem with conventional fasteners is that a tonneau cover tends to expand and contract, depending upon weather conditions. It is difficult to adjust the cover's tautness if the fastener on the truck is in a fixed position with respect to the direction the cover must be pulled to increase its tautness.

SUMMARY OF THE INVENTION

The broad purpose of the present invention is to provide a pair of adjustable mating fasteners, one mounted on the tonneau cover and the other mounted on the pick-up truck cargo box.

In one form of the invention, a male snap fastener is mounted on a rail installed on the cargo box top edge. An example of such a rail may be seen in U.S. Pat. No. 5,121,960 which was issued Jun. 16, 1992. A clamp attaches the rail to the cargo box sidewall at a right angle to the direction the tonneau cover is pulled to increase it's tautness.

The rail has a dovetail-shaped ridge. The male fastener has a spring steel base with a pair of down-turned edges that snap on the ridge. The male fastener has a head off-set from the center of the base. The fastener can be removed from the rail, reversed 180° and re-snapped on the ridge. The off-set fastener is then either closer or farther from its former position to adjust the cover's tautness.

Another form of the invention contemplates the rail having one or more parallel slots for receiving the fastener. The fastener location can be adjusted either by relocating it to a different slot, or reversing the fastener in one of the slots.

Still another form of the invention contemplates a rail having a series of parallel ridges, the fastener being mounted on a selected ridge.

In each case, the fastener can be either re-positioned or relocated to one of several possible positions for adjusting the tautness of the cover.

In still another form of the invention, the rail has a single slot, but the fastener has a multi-sided base so as to be receivable into the slot in one of several positions. The fastener head is located in a position corresponding to the desired degree of tautness.

The invention contemplates other forms of fasteners, for example, a head could be mounted on the rail, and a keyhole-shaped eyelet carried on the cover for receiving the head. The invention contemplates a fastener mounted on the cargo-box in either a fixed or a sliding position.

Still further objects and advantages of the invention will become readily apparent to those skilled in the art to which the invention pertains upon reference to the following detailed description.

DESCRIPTION OF THE PREFERRED EMBODIMENT

Figure 1:
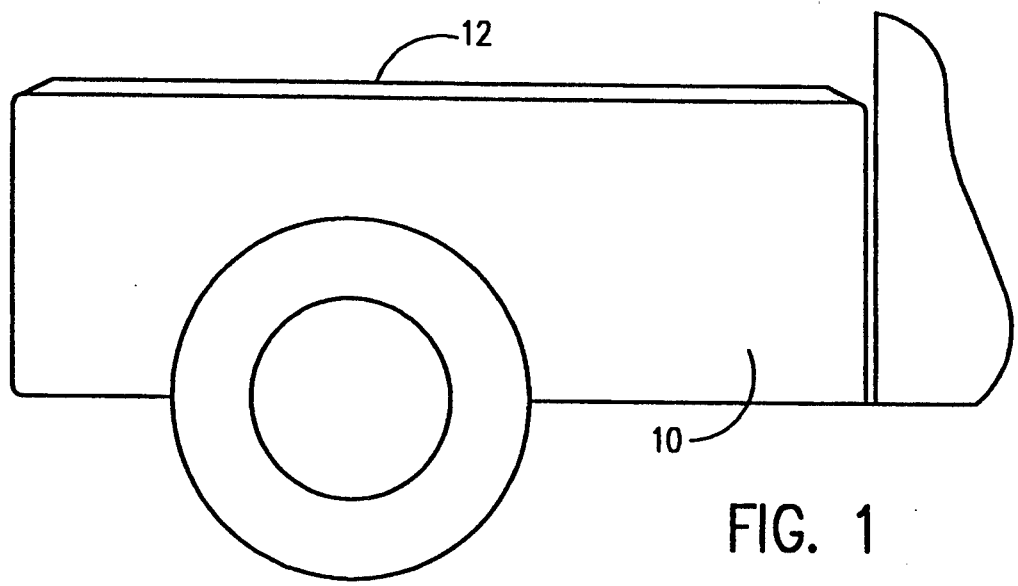
FIG. 1 is a side view of a pick-up truck having a tonneau cover fastened around the top edges of the cargo box.
Figure 2:
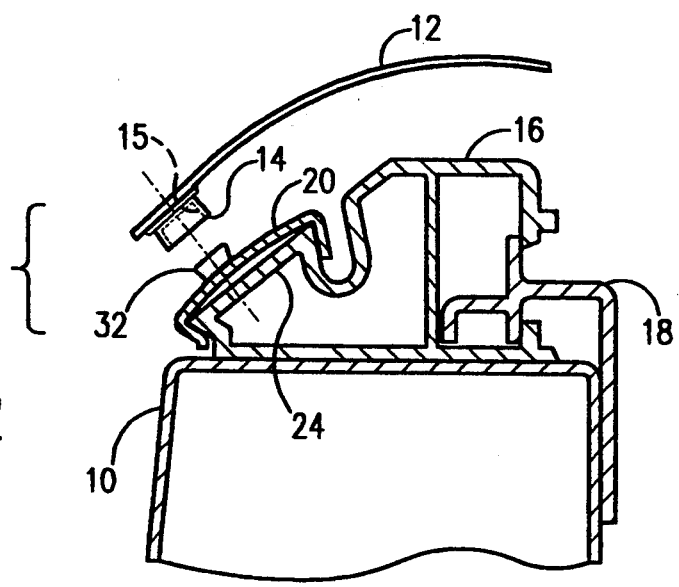
FIG. 2 is an enlarged sectional view showing the tonneau cover frame with a rail supporting a male snap fastener, and showing a female snap fastener carried on the tonneau cover.

Referring to the drawings, FIG. 1 illustrates a pick-up truck cargo box 10 having a tonneau cover 12. Cover 12 is formed of a flexible fabric material, and may have its midsection supported by bows, not shown. A series of spaced female snap fasteners are attached in the conventional manner along the tonneau cover edges. A typical fastener 14, illustrated in FIG. 2, has an internal opening 15.

The tonneau cover is mounted on a frame which includes an extruded aluminum rail 16 connected by clamping means 18 to the cargo box, as illustrated in my co-pending patent application. The rail extends the full length of the frame but can be easily separated from the other frame members.

Figure 6:
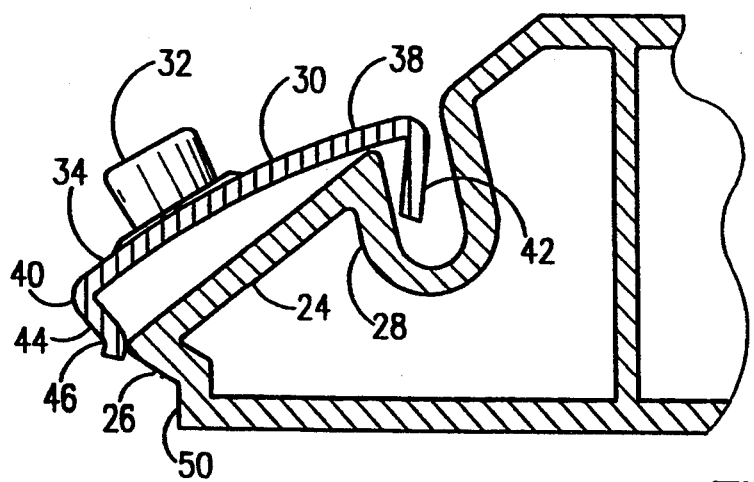
FIG. 6 is an enlarged view showing the manner in which the male snap fastener is snapped onto the rail.

Rail 16 has a somewhat dovetail-shaped ridge 20 including a flat midsection 24, inclined with respect to the bottom horizontal wall of the rail, and a pair of inclined downwardly depending sidewalls 26 and 28, as best illustrated in FIG. 6.

A male fastener member 30 includes a head 32 attached to a spring steel, sheet metal base 34. Fastener member 30 is conventional and adapted to be coupled with female snap fastener 14 by pressing the two fasteners together until head 32 snaps into opening 15. They are separated by pulling the upper fastener away from the lower fastener head.

Base 34 has a width and length greater than the diameter of fastener head 32. Head 32 has a hollow, slightly tapered configuration, as shown in FIG. 6.

Figure 4:
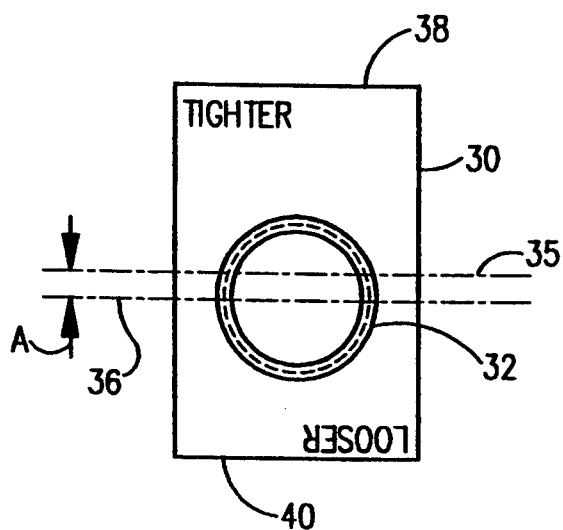
FIG. 4 is an enlarged view of the male snap fastener.
Figure 5:
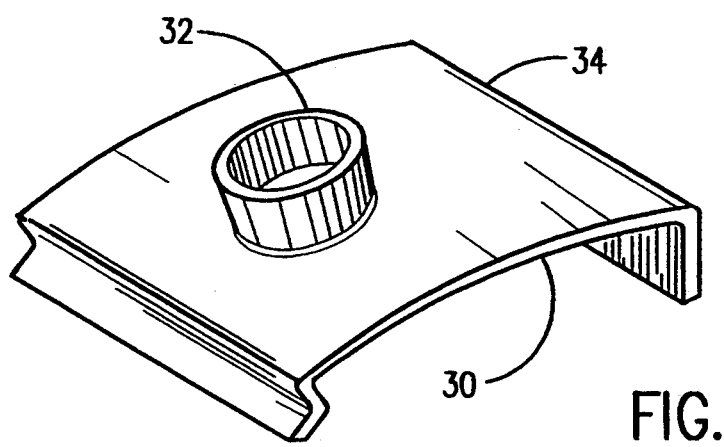
FIG. 5 is a perspective view of the male snap fastener.

Referring to FIG. 4, the centerline 36 of fastener head 32 is off-set a distance "A" with respect to centerline 35 of base 34. When the snap fastener is mounted on the rail, centerline 35 of base 34 is above the longitudinal axis of ridge 20. Centerline 35 is parallel to and midway between side edges 38 and 40 of the fastener base.

Side edge 38, as best seen in FIG. 6, is bent downwardly from the midsection of base 34 to form a sidewall 42 which forms an acute angle with respect to the flat midsection of the base. Similarly, the opposite side edge of base 34 is bent downwardly at 40 to form a sidewall 44 which, in its unflexed position, also forms an acute angle with respect to the midsection of the base. The lower edge of wall 44 is bent at 46 to form an elbow at an obtuse angle with respect to sidewall 44. The width of base 34 accommodates the width of the flat midsection of ridge 20. Side walls 42 and 44 are bent so that the distance from elbow 46 to the lower edge of wall 42 is less than the width of the flat midsection of the ridge.

The fastener is mounted on the rail by engaging base 30 with the ridge, as shown in FIG. 6, with one wall embracing the upper sidewall of the ridge and the elbow engaging the lower edge of the ridge. The user then presses the base toward the ridge, flexing wall 44 outwardly, until elbow 46 clears the edge of the ridge and the base snaps on the ridge.

The lower edge of wall 26 of the ridge has a shallow ridge 50 formed at an obtuse angle with respect to wall 26. Ridge 50 provides means for inserting a tool, such as a screwdriver between ridge 50 and the lower edge of wall 44, to pry off the snap fastener.

Figure 3:
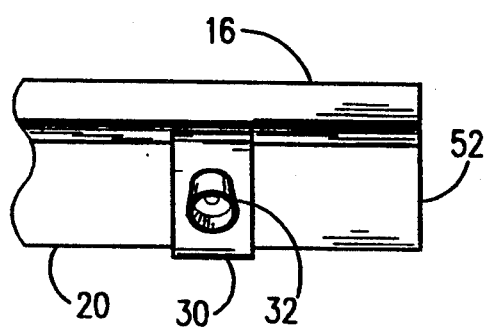
FIG. 3 is a top view of the rail and the male snap fastener.

Alternatively, the snap fastener can be easily removed from the rail by sliding the base off the extreme end 52 of the rail, as can be seen in FIG. 3.

Consequently, it is to be understood that we have described a snap fastener that can be easily mounted on or removed from a dovetailed ridge. The snap fastener can be slid along the rail to an adjusted position accommodating the location of the female snap fastener on the tonneau cover. Further, the male snap fastener can be reversed 180° to relocate the fastener in the transverse direction with respect to the longitudinal axis of the rail, either to loosen or to tighten the tonneau cover. Further, although a male fastener is illustrated as being mounted on the rail, the respective locations of the male and the female snap fasteners on the rail and the tonneau could be reversed.

Figure 7:
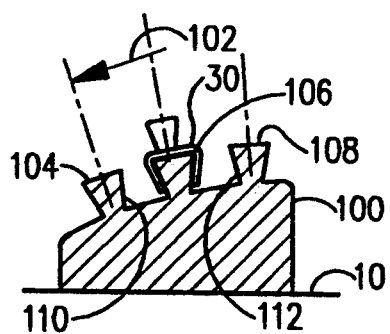
FIG. 7 is a cross-sectional view of a multi-ridged rail or receiving the fastener.
Figure 8:
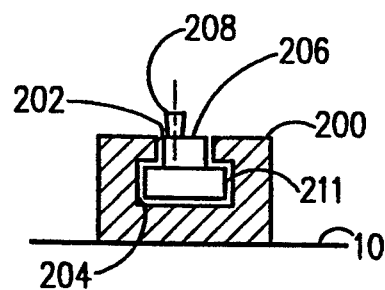
FIG. 8 is a view of a rail having a slot with a multi-sided fastener.
Figure 14:
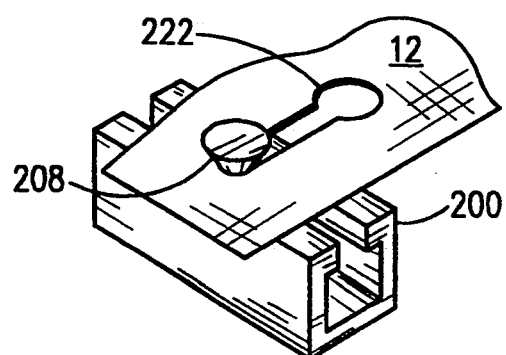
FIG. 14 is a view of still another form of a fastener.

FIGS. 7, 8 and 14 illustrate other forms of the invention. For example, rail 100 could be mounted on the pick-up truck side wall 10 in place of rail 16. Rail 100 is elongated and mounted in a direction tranverse to the direction, designated at 102, in which cover 12 is pulled in order to tighten the cover. Rail 100 has three parallel dovetail ridges 104, 106 and 108 which are spaced to form a pair of parallel slots 110 and 112. The ridges and slots are all in a direction at right angles to the pulling direction 102.

Male fastener 30 is mounted on a selected ridge, in this case, ridge 106, to adjust the tautness of the cover. The fastener alternatively could be mounted on ridge 108 to loosen the cover, or on ridge 104 to increase the tautness of the cover. Alternatively, the male snap fastener can be viewed as being mounted in a selected slot with its side edges in selected pairs of slots 110 or 112.

FIG. 8 illustrates another rail 200 which could be employed on a pick-up truck side wall 10 in place of rail 16. In this case, rail 200 has a hollow extruded configuration forming a single slot 202. The base of the slot is widened at 204. A fastener 206 is mounted in the slot. The fastener has a head 208 that is identical to fastener head 32. The upper part of fastener 206 has a width somewhat less than the width of slot 202, and a four-sided base 211 having a width greater than slot 202. The fastener base can be slid along the length of the slot.

FIGS. 9–12 illustrate head 208 located in four different positions with respect to the direction 102 the cover is pulled. Direction 102 is also at right angles to the longitudinal axis 210 of rail 200.

Figure 9:
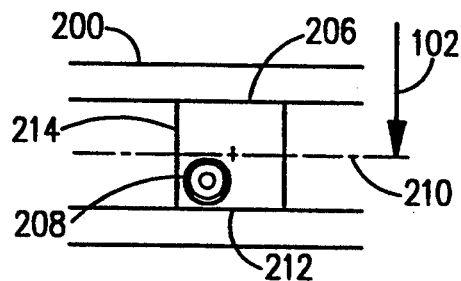
FIG. 9–12 illustrate the various positions of the fastener in the slot of the rail of FIG. 8.
Figure 10:
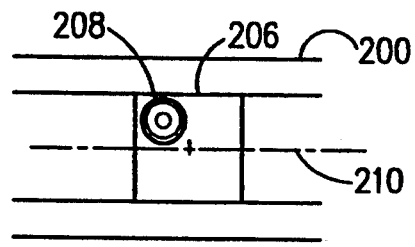
Figure 11:
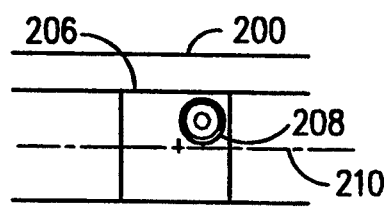
Figure 12:
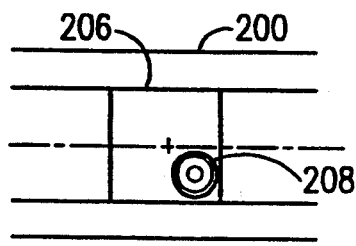

The upper part of fastener 206 has a four-sided, square configuration. Head 208 is mounted on the top of fastener 206 in a position closely adjacent the centerline of the fastener base which coincides with the centerline of the rail axis, as is illustrated in FIG. 9. The head is located adjacent side edge 214, about one-third the distance between the centerline of the base and side edge 212. Consequently, when the fastener base is rotated 90° to the position illustrated in FIG. 10, head 208 occupies a position above axis 210 in order to loosen the cover. When the fastener base is rotated another 90° to the position illustrated in FIG. 11, the head is then still above axis 210 but below the position illustrated in FIG. 10. Similarly, when the fastener base is rotated a still further 90° to a position illustrated in FIG. 12, head 208 is then below its position of FIG. 9, that is, it is advanced in the direction 102 in order to increase the tautness of the cover.

Figure 13:
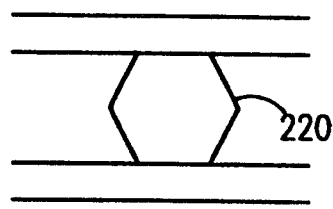
FIG. 13 is a view of the base of the fastener in FIG. 8.

FIG. 13 illustrates an alternative lower fastener base 220 which may be substituted for the configuration of fastener 206 which permits the user to rotate the base to six positions. Consequently, the fastener head can be moved to six different locations in direction 102. Other multi-sided positions may also be used.

Referring to FIG. 14, fastener head 208 receives a keyhole-shaped eyelet opening 222 carried on the tonneau cover 12 to illustrate another form of fastening device for coupling the cover fastener to the rail-mounted fastener. Although a snap fastener device is preferred, FIG. 14 illustrates that other forms of fasteners may be used as well.

Having described our invention, we claim:

1. A cover assembly, comprising:
   an elongated rail structure;
   a fabric cover that is dimensionally changeable;
   a first fastener attached to the fabric cover;
   a second fastener suited to be coupled with the first fastener;
   mounting structure slidably mounted along the rail structure and supporting the second fastener so as to be rotatable with the second fastener in a selected position along the rail structure between either a first coupling position or in a second coupling position, the second fastener in the first coupling position being spaced with respect to the location of the second fastener in the second coupling position in a direction transverse to the length of the rail structure, whereby the tautness of the cover may be adjusted to accommodate a change in dimensions of the cover according to whether the second fastener is coupled to the first fastener in said first coupling position or in said second coupling position.

2. A fastener assembly as defined in claim 1, in which the second fastener includes a head mounted on the mounting structure, and the first fastener comprises means having an opening for receiving the head to a coupling position.

3. A fastener assembly as defined in claim 1, in which the rail structure has a ridge means for engaging the second fastener.

4. A fastener assembly as defined in claim 1, in which the rail structure has slot means for engaging the second fastener.

5. A fastener assembly as defined in claim 1, in which the rail structure has a ridge, and the second fastener has structure for engaging the ridge in either said first coupling position or in said second coupling position.

6. A fastener assembly as defined in claim 1, in which the mounting structure has a multi-sided base and the rail structure has a slot for receiving the base in a plurality of positions, the base being adjustable in the slot by rotating the base when it has been removed from the slot such that the second fastener is in a position which depends upon the position in which the base is received in the slot.

7. A fastener assembly as defined in claim 6, in which the mounting structure has a four-sided base for supporting the second fastener in four different coupling positions.

8. A fastener assembly as defined in claim 6, in which the mounting structure has a six-sided base so as to be receivable in six different coupling positions in the slot.

9. A fastener assembly as defined in claim 1, in which one of the fasteners is a first snap fastener and the other fastener is a second, complementary snap fastener engagable with the first snap fastener.

10. A fastener assembly as defined in claim 1, in which the rail structure has a plurality of parallel ridges spaced in said first direction, and the mounting structure is adapted to be mounted on a selected ridge to adjust the tautness of the fabric cover.

11. A fastener assembly as defined in claim 1, in which the rail structure has a plurality of parallel slots spaced in said first direction, and the mounting structure is adapted to be mounted in a selected slot to adjust the tautness of the fabric cover.

12. A fastener assembly as defined in claim 9, in which the second snap fastener is removable from the rail structure by being moved in a direction transverse to the longitudinal axis of the rail nail.

13. A fastener assembly as defined in claim 1, in which the second fastener may be removed from the rail structure by sliding the second fastener off the end of the rail structure.

14. A fastener assembly as defined in claim 1, in which the rail structure includes an extruded rail having a generally channel-shaped longitudinally running hollow section including a base section and a pair of side walls disposed along opposite side edges of the base section and inclined toward one another, and the second fastener comprises a sheet metal base having a midsection generally corresponding in width to that of the base section of the extruded rail, and a pair of downturned resilient side edges bent toward one another in a dimension less than the width of the base section of the rail, one of the fastener base side edges being bent in the opposite direction to form an elbow such that as the fastener base is pushed toward the rail, at least one of the resilient side edges of the fastener base flexes outwardly until the elbow has passed one of the side edges of the rail base section, and then flexes inwardly such that the side edges of the fastener base section embrace the side walls of the rail.

* * * * *